United States Patent [19]

Brusewitz

[11] Patent Number: 4,837,617

[45] Date of Patent: Jun. 6, 1989

[54] METHOD AND MEANS FOR CODING AND DECODING PICTURE INFORMATION

[75] Inventor: Harald Brusewitz, Farsta, Sweden

[73] Assignee: Televerket, Farsta, Sweden

[21] Appl. No.: 156,620

[22] Filed: Feb. 17, 1988

[30] Foreign Application Priority Data

Feb. 20, 1987 [SE] Sweden ................................. 8700726

[51] Int. Cl.$^4$ ........................ H04N 7/133; H04N 7/137
[52] U.S. Cl. ..................................... 358/133; 358/135; 358/136
[58] Field of Search ........................ 358/133, 135, 136; 375/31, 33; 364/725, 726

[56] References Cited

U.S. PATENT DOCUMENTS

| | | | |
|---|---|---|---|
| 4,125,861 | 11/1978 | Mounts | 358/133 |
| 4,134,134 | 1/1979 | Lux | 358/133 |
| 4,580,162 | 4/1986 | Mori | 358/135 |
| 4,656,500 | 4/1987 | Mori | 358/135 |
| 4,704,628 | 11/1987 | Chen | 358/135 |
| 4,707,738 | 11/1987 | Ferre | 358/136 |
| 4,723,161 | 2/1988 | Koga | 358/136 |
| 4,757,383 | 7/1988 | Tanaka | 358/133 |

Primary Examiner—Howard W. Britton
Attorney, Agent, or Firm—Pollock, Vande Sande & Priddy

[57] ABSTRACT

A method and apparatus for coding and decoding picture information is described. According to prior art two modes, are utilized for transmitting picture information, respectively. According to the present invention advantages are obtained in using a mixed mode, i.e. certain frequency components are transmitted with prediction and the remaining components without. In the invention two channels, with and without prediction, are utilized respectively. These channels are selectively connected by means of switches, which are controlled by a control means.

10 Claims, 3 Drawing Sheets

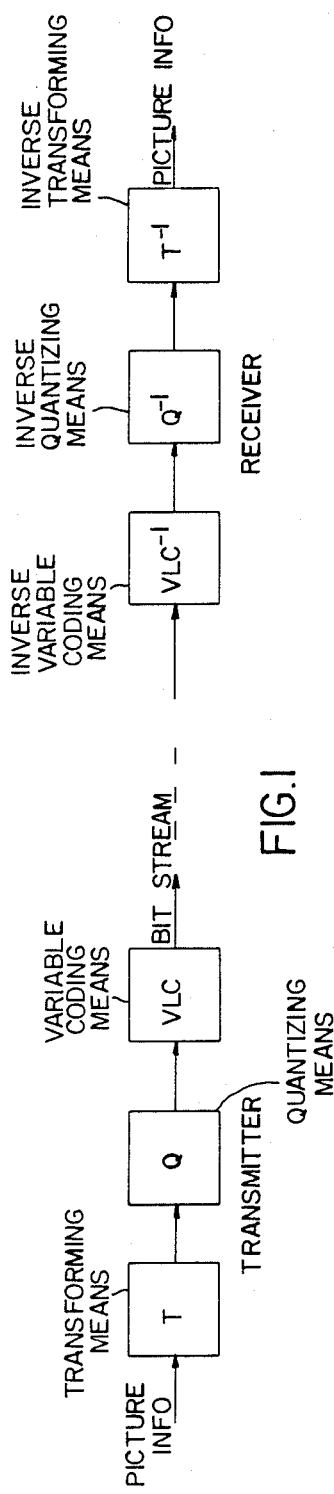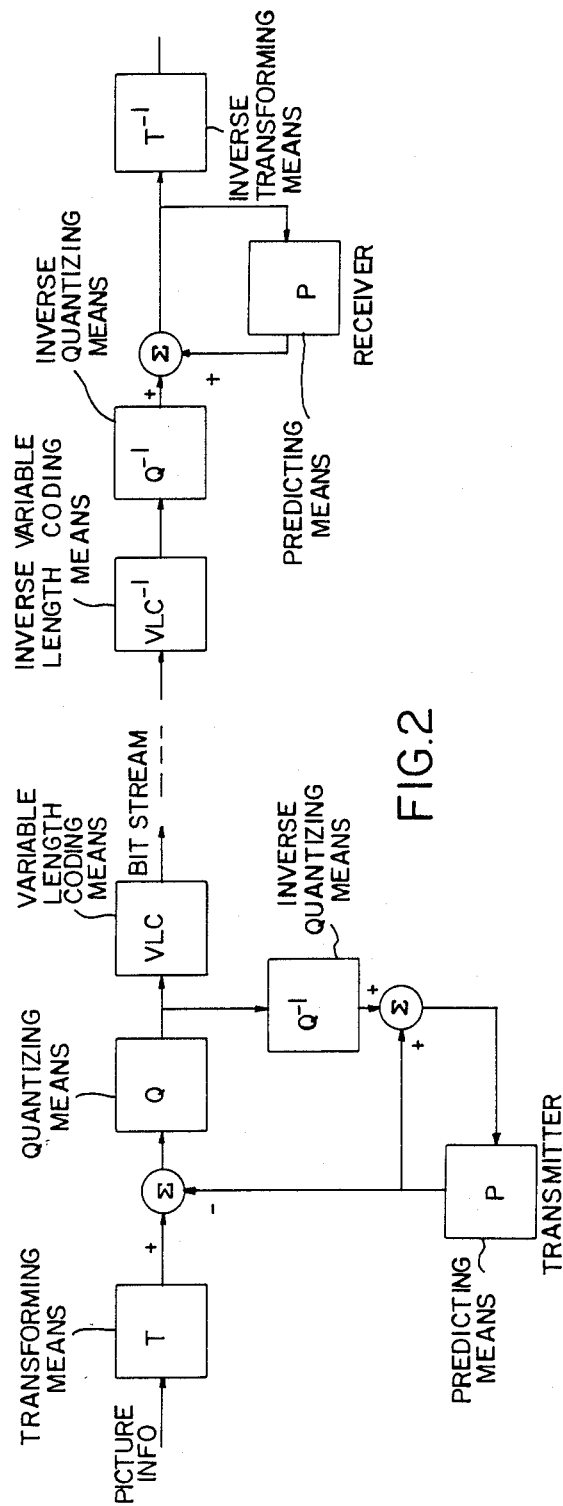
FIG.1
FIG.2

|  | Coeff. | | | | | | | | | |
|---|---|---|---|---|---|---|---|---|---|---|
| U1 INTER | 0 | 1 | 0 | -2 | 4 | 0 | 2 | 3 | 0 | 1 |
| U2 INTRA | 4 | -2 | 1 | 1 | 2 | -1 | 0 | 0 | 0 | 0 |

BIT STREAM

| | | | | | | | | | | | |
|---|---|---|---|---|---|---|---|---|---|---|---|
| INTER | 1 | 3 | 1 | 5 | 7 | 1 | 5 | 6 | 1 | 3 | 3 | Σ = 36 |
| INTRA | 7 | 5 | 3 | 3 | 5 | 3 | 3 | | | | | Σ = 29 |
| MIXED | 1 | 3 | 1 | 3 | 3 | 5 | 3 | 3 | | | | Σ = 22 |

METHOD AND MEANS FOR CODING AND DECODING PICTURE INFORMATION

FIELD OF THE INVENTION

The present invention relates to a method and means for picture coding and decoding moving pictures intended for digital transmission over e.g. telephone wires.

TECHNICAL BACKGROUND

As is well known, transmitting picture information about moving pictures over telephone wires without any adaption of the information requires broad band. Therefore, a number of methods have been developed for compressing the information without greatly deteriorating the image quality.

Predictive DPCM coding (differential pulse code mudulation) is such a method of compressing the information. In this method the knowledge that there are only small differences between two successive images is utilized. In the receiver a predictor predicts what the next image looks like by means of the preceding image. A difference is formed and only the prediction error has to be transmitted to the receiver, which contains a similar predictor for reconstructing the original image.

In transform coding the image is divided into blocks of e.g. 8×8 or 16×16 picture elements or PEL. The image content is mathematically transformed into so called transform coefficients which are then quantized. The coefficients for gray areas are zero, according to this method, and do not have to be transmitted over the telephone wires.

DPCM coding and transform coding can be combined into a third method, in this application called hybrid coding (strictly hybrid DPCM transform coding), thus utilizing prediction as well as transformation. Hence, a block is transformed from its PEL domain or the time plane to its transform domain or the frequency plane by means of e.g. a discrete cosine transform (DCT). Then the transform coefficients are quantized and the prediction takes place in the transform domain with a similar loop as in the DPCM coding. This order may also be reversed so that the transformation takes place within the prediction loop and the prediction in the PEL domain, which is previously known. The transform coefficients, which can now take on discrete values between e.g. $-128$ and $+127$, are then detected in the frequency plane, the information carrying coefficients being concentrated to the beginning of the block. In addition, the probability for the different values of the transform coefficients is concentrated around zero, i.e. the probability for the value zero is greater than the probability for the values $\pm 1$ which is greater than the probability for the values $\pm 2$, etc.

Before the coefficients are transmitted they are coded with variable length coding, the structure of a block having been utilized such that the value zero, which is most probable, gets a code having the least number of bits, and higher values get a greater number of bits according to their probabilities. The terminating zeros of the block are not coded, but the end of the block is defined by a special character EOB (end of block).

The three methods above are described more closely in Televerket's technical periodical, Tele, vol. 91, No. 4, 1985, pages 1–7, and the periodical Elteknik, No. 14, 1986, pages 48–52.

A method and a means for variable length coding is described in my co-pending patent application Ser. No. 156,683 filed Feb. 17, 1988 entitled "Method and means for variable length coding".

The methods above may be divided into two modes, with prediction for all frequencies (interframe), and without prediction (intraframe).

Coding without prediction is specially advantageous in situations having scene changes and a large amount of motion, since a preceding image contains very little or no information at all about the next image. This mode is called "intra" in this application.

Coding with prediction is especially efficient for slowly moving pictures and unchanged background areas. This mode is here called "inter".

According to prior art, these two transmitting modes have been utilized, thus, for prediction for all frequencies or no prediction at all. The drawback to "inter" is that the prediction error is considerable for high frequencies, especially when there is much movement or changes in the images. According to the present invention savings can be made by transmitting certain frequencies with prediction and the remaining frequencies without prediction, i.e. by using a "mixed" mode.

SUMMARY OF THE INVENTION

According to the present invention, the above-mentioned advantages are achieved by a method for picture coding a block containing picture information in the form of data words, the data words being transformed from the time plane to the frequency plane into transform coefficients, which are quantized.

The feature of the invention is that the transform coefficients are transmitted over two channels, the coefficients in the first channel being predicted and in the second channel not being predicted, either channel being connected to a variable length coding means coding the coefficients, and the connection of the channels being controlled by a control means.

Preferably, the connection is controlled such that the smallest coefficients (of inter or intra) are transmitted to the variable length coding means and side information about the channel connection is formed and transmitted to the receiver.

The invention also relates to a means for picture coding comprising a transforming means for transforming from the time plane to the frequency plane the data words into transform coefficients, and a varaible length coding means.

Characteristic of the invention is that the transforming means is connected to two channels, the first channel comprising a quantizing means and a feed back loop comprising an inverse quantizing means and a predicting means, the output of which together with the output of the inverse quantizing means through an adder is connected to the input of the predicting means through a first switch and the output of which through a subtracter is connected to the input of the quantizing means, the output of the first channel through a second switch conntected with the first switch being connected to the variable length coding means and the second channel comprising a quantizing means, the output of which, on one hand, is connected to an inverse quantizing means the output of which through the first switch is connected to the predicting means and, on the other hand, through the second switch is connected to the variable length coding means, and that a control means controls the switches.

BRIEF DESCRIPTION OF THE DRAWINGS

The invention will now be described with reference to the appended drawings, in which;

FIG. 1 discloses a block diagram of a picture coding means including a transmitter and a receiver for transform coding;

FIG. 2 discloses a block diagram of a picture coding means for hybrid coding,

The table gives the values of an example.

DETAILED DESCRIPTION OF THE INVENTION

As a background of the invention there are disclosed in FIGS. 1 and 2 a transmitter and a receiver for transform coding and hybrid coding, respectively.

The transmitter in the transform coding in FIG. 1 comprises a transforming means T, a quantizing means Q and a variable length coding means VLC, the functions of which are easily realized. The receiver in the transform coding of course comprises the corresponding inverse means. The device works in the intra mode all the time.

The transmitter in the hybrid coding in FIG. 2 comprises a transforming means T, a quantizing means Q and a variable length coding means VLC, which can be similar as in the transform coding. A feed back loop having an inverse quantizing means $Q^{-1}$ is also part of the transmitter, and a predicting means P, essentially providing a delay corresponding to one image. Suitable additions and subtractions result in that only the prediction error enters the input to VLC. The receiver in the hybrid coding comprises corresponding inverse functions in the reversed order as well as a simple prediction loop between the inverse quantizing means and the inverse transforming means. The device works in the inter mode all the time.

Figure 3:
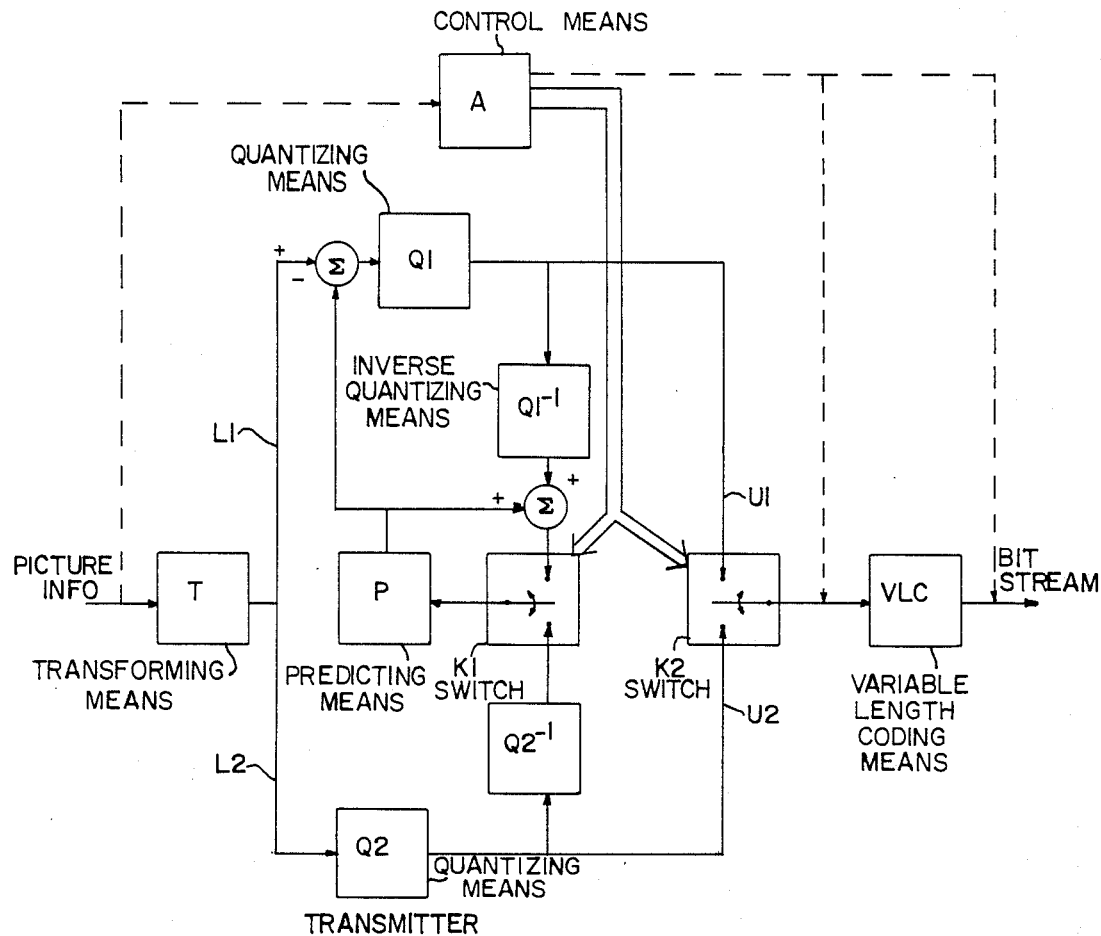
FIG. 3 is a block diagram of a display coding means according to the present invention, and FIG. 4 discloses a spectrum for transform coding and the prediction error, respectively.
Figure 3:
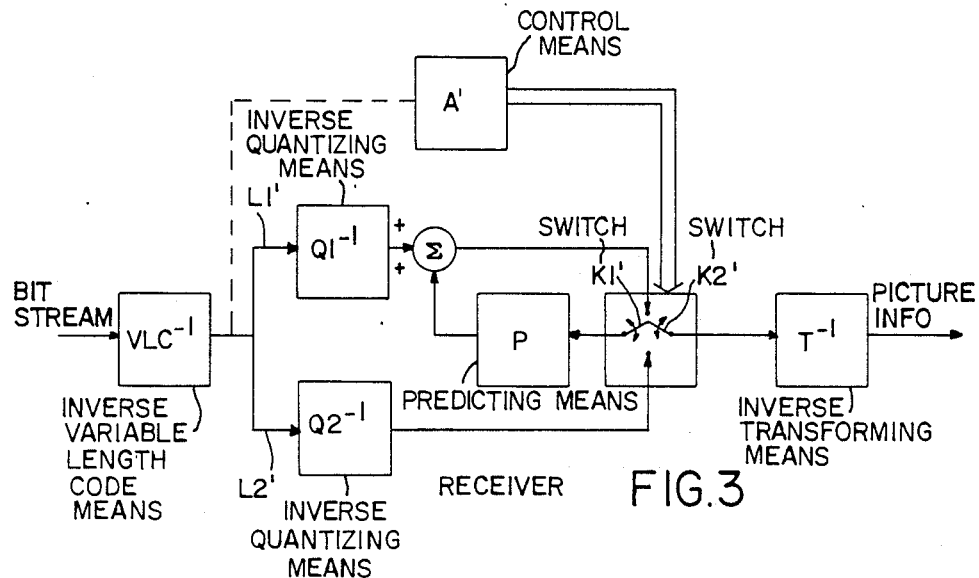

In FIG. 3 there is disclosed a preferred embodiment of the present invention comprising a transforming means T and a variable length coding means VLC similar as in prior art. However, between these means are two loops L1, L2, selectively connectable by means of a switching means having two switches K1, K2, interconnected and controlled by a control means A. In comparison with FIGS. 1 and 2, respectively, it is realized that the lower channel L2 in the present invention essentially corresponds to the transform coding in FIG. 1 and that the upper channel L1 completely corresponds to the hybrid coding according to FIG. 2. Compared with FIG. 1, the lower channel has furthermore been provided with an inverse quantizing means $Q2^{-1}$, having the task to provide for the predicting means P all the time keeping correct information about the latest image even if it is not utilized when the lower channel is connected. The receiver according to the present invention comprises in the same way as previously an inverse variable length code means $VLC^{-1}$ and an inverse transforming means $T^{-1}$. Therebetween is an upper channel L1' corresponding to the receiver in the hybrid coding in FIG. 2 and a lower channel L2' corresponding to the receiver in the transform coding in FIG. 1. The receiver also comprises a switching means having two switches K1', K2' to selectively connect the lower or the upper channel. The switches K1', K2' are controlled by a control means A'.

Figure 4:
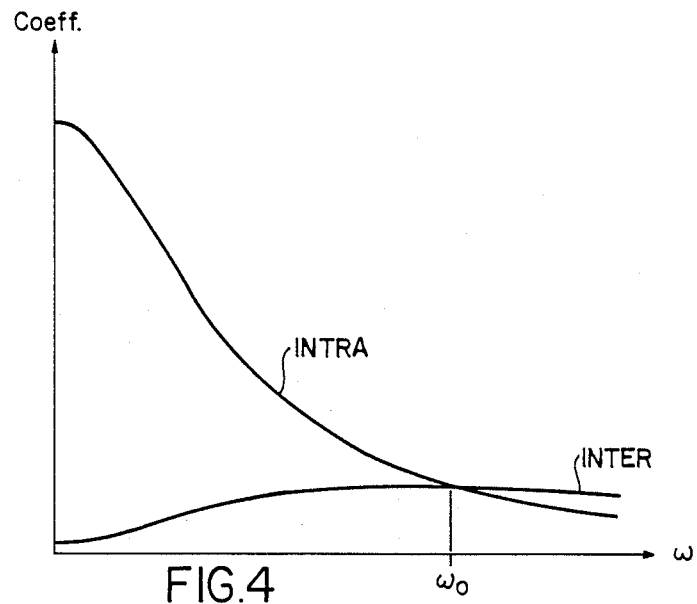

In FIG. 4 there is disclosed a spectrum for transform coding for the intra mode and the prediction error for the inter mode, respectively, the average size of the coefficients being plotted against the frequency. As appears, the two modes have completely different spectrums. Intra has large coefficients for low frequencies, whereas inter is more flat in appearance. For a certain frequency, in the figure designed $\omega_o$, the curves intersect and the prediction error is bigger than the coefficients in the transform coding. Thus, it would be suitable here to change transmission mode from intra to inter, which is utilized according to the present invention. Since variable length coding is utilized, the number of bits is less in coding small coefficients and thus, there is a saving in the bit stream to be transmitted from the transmitter to the receiver.

Which components to be transmitted inter and intra are controlled by switching the switches K1 and K2. This control can be done in a number of different ways.

I. A detecting means (not shown) is connected to the outputs U1 and U2 and forms the difference between the components from the respective channel, L1, L2, and controls the switching means K1, K2 such that all the time the smallest component is transmitted to VLC. Simultaneously side information is formed, which is to be transmitted to the receiver and defines which channel L1' or L2' is to be used. The side information thus controls the switching means K1', K2' in the receiver. There may be restrictions on how to mix inter and intra. The number of switches can be limited, for instance. As a general rule, the more restrictions, the less information is required to define the mixing. With no restriction at all, it would require one bit per component for the side information.

II. Low frequencies are transmitted inter and high frequencies are transmitted intra. The critical frequency $\omega_o$ is determined by detecting the channel outputs U1 and U2, so that the coefficients are as small as possible and thus the number of bits as small as possible, cf. the example below. The information about the critical frequency $\omega_o$ can be transmitted on a number of different ways to the receiver. A special address word, for instance, which is not part of VLC, can be transmitted by videoplex to the receiver. The address word defines when the switching is to take place in the receiver. Another possibility is that a special "EOB word", which is part of VLC, defines where the switching is to take place.

III. Low frequencies are transmitted inter and high frequencies are transmitted intra. The critical frequency $\omega_o$ is constantly fixed, the first seven frequencies, for instance, can be transmitted inter. Thus, no detection of the outputs U1 and U2 is required and neither is any side information to the receiver required for defining the switch over. In variable length coding in some of the above methods it is advantageous to use the invention described in my previously mentioned Swedish patent application. "Method and means for variable length coding".

EXAMPLE

In the table there is given a fictive example of how the invention may work according to the above method II. In the lines U1 and U2 there are disclosed the values of the coefficients formed by transforming and passing through channels L1 and L2, respectively, these values existing at channel outputs L1 and L2, respectively. In conventional hybrid coding the words are coded at U1 by variable length coding to the bit stream inter, the last three bits (digit 3) representing EOB. The number of bits are 36. In conventional transform coding the bit steam intra is produced, the last three bits also now representing EOB. The number of bits are 29. According to the present invention a switching is done from inter to intra after the first three frequencies, as shown by the arrow, the bit stream as mixed being achieved by variable length coding. The underlined threes represent EOB characters, the first defining where the switching is to take place from inter to intra and the last defining the end of the block. The number of bits, is according to the invention, is 22, implying an essential saving compared with the two previous techniques.

Hereinbefore, an exemplifying embodiment of the present invention has been described and of course several variants thereof are possible without departing from the inventive idea. Using motion compensated prediction in hybrid coding is known, for instant. In doing so the prediction must take place in the PEL domain, resulting in that the transformation takes place inside the feedback loop, also containing an inverse transformation. The present invention can of course be used in connection with such a coding as well.

Guided by the present description a skilled person can construct and apply the present invention by means of components known per se. The invention is limited only by the claims below.

What is claimed is:

1. A method of picture coding a block containing picture information in the form of data words, comprising the steps of:
    transforming the data words, from time domain to frequency domain, into transform coefficients;
    quantizing the transform coefficients;
    transmitting the quantized transform coefficients over two channels;
    predicting the transform coefficients in one of the channels, the transform coefficients in the other channel not being predicted;
    connecting either channel to a variable coding means for coding the transform coefficients; and
    controlling the connection of the channels by a cotnrol means.

2. A method according to claim 1, wherein the controlling step further comprises the steps of:
    controlling the connection for transmitting the smallest coefficients to the variable length coding means; and
    forming and transmitting, respectively, side information about the channel connection to a receiver.

3. A method according to claim 1, further comprises the step of:
    switching from the one of the channels to the other channel at a fixed frequency.

4. A method of picture decoding picture information coded to the frequency domain, comprising the steps of:
    decoding the picture information, through an inverse variable length coding means, into coefficients;
    transmitting the coefficients over two channels;
    inverse quantizing the coefficients in one of the channels;
    adding the inverse quantized coefficients through a feedback loop with prediction;
    inverse quantizing the coefficients in the other channel without prediction feedback; and
    connecting either channel to an inverse transforming means for inverse transforming the coefficients into a time domain.

5. A method according to claim 4, wherein the connecting step further comprises the step of:
    controlling the connection of the channels by means of side information from a picture coding means.

6. A method according to claim 4, further comprising the step of:
    switching from the one of the channels to the other channel at a fixed frequency.

7. Means for picture coding a block containing picture information in the form of data words, comprising:
    a transformer means for transforming, from time domain to frequency domain, the data words into transform coefficients;
    a variable length coding means;
    two channels being connected to the transformer means, wherein one of the channels includes:
    a first quantizing means and a feedback loop connected thereto; wherein the feedback loop includes
        (i) a first inverse quantizing means;
        (ii) a predicting means;
        (iii) an adder for receiving the respective outputs from the inverse quantizing means and the predicting means;
        (iv) a first switch for connecting the output from the adder to the input of the predicting means;
        (v) a subtracter for connecting the output of the predicting means to the input of the quantizing means;
    a second switch being connected with the first switch;
    wherein the output of the one channel is connected, by means of the first and second switches, to the variable length coding means, the first switch being in a first position for closing the feedback loop in the one channel, and the second switch being in a corresponding first position for connecting the output of the one channel to the variable length coding means;
    wherein the other of the channels includes:
        (vi) a second quantizing means;
        (vii) a second inverse quantizing means having an input connected to a first output of the second quantizing means, the second inverse quantizing means having an output connectable through the first switch to the predicting means;
    wherein the second quantizing means has a second output connectable through the second switch to the variable coding means; and
    a control means for controlling the first and second switches;
    whereby, when set to a second position, the first switch connects the output of the second inverse quantizing means to the predicting means; and
    whereby, when set to a corresponding second position, the swecond switch connects the output of the other channel to the variable length coding means.

8. Means for picture coding according to claim 7, wherein the control means comprises:
    a detector member, detecting the size of the coefficients from the respective outputs of the channels, for controlling the first and second switches, the side information about at least one switching frequency being formed for transmission to a picture decoding means.

9. Means for picture decoding picture information coded to the frequency domain, comprising:

an inverse variable length coding means for decoding input picture information;

an inverse transforming means for inverse transforming the picture information to time domain;

two channels being connected to the inverse variable length coding means;

wherein one of the channels includes:

a first inverse quantizing means and a feedback loop connected thereafter, the feedback loop including:
  (i) a predicting means;
  (ii) a first switch having a first position for closing the feedback loop; and
  (iii) a second switch interconnected with the first switch for connecting the first channel to the input of the inverse transforming means;

wherein the other of the channels comprises:
  (iv) a second inverse quantizing means whereby, when the first switch is set at a second position, the output of the second inverse quantizing means is connected to the predicting means; and whereby, when the second switch is set at a second position, the second channel is connected to the inverse transforming means; and a control means for controlling the first and second switches.

10. Means for picture decoding according to claim 9 wherein the control means receives side information from a picture coding means for controlling the first and second switches.

* * * * *